United States Patent Office 3,326,827
Patented June 20, 1967

3,326,827
EPOXIDE-TREATED TITANIUM DIOXIDE PIGMENT AND USE THEREOF IN POLYVINYL RESINS
Albert J. Mullin, Metuchen, N.J., assignor to National Lead Company, New York, N.Y., a corporation of New York
No Drawing. Filed Nov. 26, 1963, Ser. No. 326,217
18 Claims. (Cl. 260—23)

The present invention relates in general to an improved titanium dioxide pigment for use in pigment vehicles; and more particularly to an epoxide-treated titanium dioxide pigment which, when incorporated in a polyvinyl resin, will provide superior pigment dispersion and color as well as heat stability.

This application is a continuation-in-part of co-pending application Ser. No. 230,274, filed Oct. 12, 1962, now abandoned.

One of the most widely used white pigments in industry today is titanium dioxide. Titanium dioxide is produced extensively by the sufate process wherein a titaniferous ore is digested in concentrated $H_2SO_4$ to form a digest cake which is dissolved in quench acid and $H_2O$ to produce a sulfate solution which, in turn, is reduced, clarified, concentrated and then hydrolyzed to precipitate $TiO_2$ hydrate. The hydrate is then filtered and washed to remove as much of the sulfate values as possible and then treated, before and/or after calcination, with suitable treating agents to impart desirable properties to the finished pigment after which the calcined pigment is milled and bagged. The finished pigment may be an anatase or rutile $TiO_2$ depending upon the treating agents and specific process controls used. Because of its outstanding hiding power, by far one of the greatest uses of rutile $TiO_2$ pigment is in coating compositions such as paints, lacquers, varnishes, enamels and the like.

With the advent of resins and particularly their extensive use as decorative wall and floor tiles, counter tops, fabrics, sheeting and the like the demand for $TiO_2$ pigment as an opacifier has steadily increased.

It has been found, however, that in certain specific applications and in particular when $TiO_2$ pigment is added to vinyl resin compositions considerable difficulty has been experienced in effecting good pigment dispersions. Moreover, it has been noted that heretofore pigmented polyvinyl resins have had relatively poor color and are especially susceptible to discoloration when heated.

It has now been discovered that by treating $TiO_2$ pigment with epoxidized esters of certain fatty acids and in particular certain epoxidized glycerides and alkyl esters the epoxide-treated pigment has improved dispersibility in and enhances the color of pigmented vehicles; and that when the epoxide treatment is combined with certain metal oxides the heat stability of the pigmented vehicle is improved. The phrase "pigment vehicle" as used herein and in the claims shall be understood to include oils, resins and plastics and in particular polymerized resins of the polyvinyl chloride type; while the term "epoxide" has reference herein to epoxidized esters of fatty acids and epoxy intermediates as herein after described.

An object therefore of the present invention is to provide an epoxide-treated $TiO_2$ pigment and method for producing the same for use in pigment vehicles.

Another object of the invention is to provide pigmentary $TiO_2$ treated with an epoxide for use in polyvinyl resins to impart improved pigment dispersion and color thereto.

A further object of the invention is to provide pigmentary $TiO_2$ treated with an epoxide in combination with a metal oxide for use in polyvinyl resins to impart improved heat stability thereto as well as improved pigment dispersion and color.

A further object of the invention is to provide a $TiO_2$ pigmented vehicle having improved pigment dispersion, color and heat stability; and method for producing the same.

These and other objects, features and advantages of the invention will become manifest from the description of the invention which follows.

Epoxidized organic compounds are generally understood to contain one or more epoxy groups, i.e. an oxygen atom, sometimes referred to as oxirane or oxirene oxygen between two bonded carbon atoms; and may occur as an epoxy intermediate, i.e. a monomolecular molecule having one or more epoxy groups; or in a more complex form as low molecular weight epoxy resins having at least two epoxy groups, usually terminal, and a hydroxyl group. Two commonly used methods for forming epoxy intermediates or resins are: (a) by direct epoxidation of one of the double carbon bonds of an unsaturated organic compound; or (b) by partial condensation of a monomolecular molecule containing an epoxy group, i.e. epichlorohydrin with difunctional materials such as bisphenols, glycols, dibasic acids and the like.

The foregoing exposition is brief in nature since the subject is a well developed art and further details can be found in any current textbook relative to epoxy resins. As to the present invention the latter does not relate to the epoxides per se but to the discovery of a new use for certain of these materials in the treatment of $TiO_2$ pigment for use in plastic, oils, resins and similar pigment vehicles.

Broadly, the present invention relates to an improved $TiO_2$ pigment comprising essentially, a $TiO_2$ pigment treated with an epoxide selected from the group consisting of epoxidized esters of fatty acids and epoxy intermediates, said esters being selected from the group of esterified fatty acids having from 1–18 carbon chain length esterified with alcohols of from 1–10 carbon chain length; and to a method for producing the same. The invention also includes $TiO_2$ pigments treated with an epoxide in combination with a metal oxide; and the use of the aforesaid epoxide-treated $TiO_2$ pigments in the production of pigmented vehicles and in particular polyvinyl resins.

The base pigment used to illustrate the present invention is a $TiO_2$ pigment, preferably but not necessarily of the rutile modification, which, as mentioned earlier, may be produced by any of the well known methods of the art. Generally the uncalcined $TiO_2$ hydrate is treated, prior to calcination, with certain alkali metal salts, phosphates and the like to insure softness and conversion to rutile.

It is also quite generally the practice to give a calcined $TiO_2$ pigment a postcalcination treatment with one or more hydrous metal oxides for improving chalking, tinting strength, oil absorption and other properties of the pigment. Typical hydrous metal oxides for effecting these improvements are the hydrous oxides of aluminum and titanium and mixtures thereof.

As will be shown in the description and examples which follow, treatment of a $TiO_2$ pigment having neither a precalcination treatment, nor a postcalcination treatment with hydrous metal oxides, with an epoxide, has been found to improve the pigment dispersion and color of the pigment vehicles to which they are added; and further it has been found that when a $TiO_2$ pigment has a precalcination and/or a postcalcination treatment with a hydrous metal oxide in combination with an epoxide not only is the dispersibility and color improved but the heat stability of the pigmented vehicle is greatly enhanced.

Turning now to the epoxide-treatment the amount of epoxide treating agent used is extremely small. The minimum effective amount depends to some extent upon the kind of epoxide used but in general is at least 0.25% of the dry weight of the pigment. The same consideration holds for the upper limit but experience has shown that a pigment having more than 1.0% has substantially similar properties to pigments having lesser amounts and hence 1.0% is considered to be the effective upper limit. In practice it has been found that when using the epoxidized esters hereinafter described the maximum improvement per increment of agent occurs at about 0.50% and hence this amount is accordingly preferred.

In referring to the amount of epoxide on the pigment it will be understood that the amount specified is based on the dry weight of the finished pigment, i.e. after drying and milling and hence the actual amount of epoxide used in treating the pigment should, in some instances, be somewhat in excess of the amount retained on the finished pigment so as to compensate for any losses which may occur during processing. In general, the amount of epoxide used in excess of the retained amount would not exceed 30%.

The actual application of the epoxide to the $TiO_2$ pigment may be effected in any one of several ways. One method, which is convenient and relatively simple, has been to dissolve the epoxide in a suitable solvent, preferably an organic liquid such as acetone, to form a thin epoxide solution and then either add the pigment to the epoxide solution to form a slurry, or, as an alternative, spray the epoxide solution onto the pigment after which the treated pigment is dried to volatilize the solvent, followed by dry milling, as for example in a fluid energy mill, to insure a uniform coating of the epoxide on the discrete particles of pigment.

By way of illustration 150 grams of a dry, micropulverized $TiO_2$ pigment may be mixed with from 0.75 to 1.5 grams of an epoxide dissolved in about 100 ml. of acetone and the mixture thoroughly stirred to form an homogeneous slurry which is then dried and ground; or alternatively when using normal plant drier discharge (non-pulverized $TiO_2$ pigment) the epoxide solution comprising from 0.75 to 1.5 grams of epoxide dissolved in about 50 ml. of acetone may be added to the pigment by sprinkling.

As an alternative the epoxides may be added to $H_2O$ to form an aqueous emulsion. In particular 150 grams of micropulverized drier discharge may be slurried with 200 ml. of water containing from 0.75 to 1.5 grams epoxide and the slurry dried and ground; or alternatively, a water emulsion may be prepared, by mixing, about 10 grams epoxide with 10 ml. of water plus about 0.2 gram of a commercial emulsifier and the emulsion applied to the pigment by spraying, dripping or the like.

While the above procedures have been applied to pigments which had been wet milled, hydroclassified and dried it will be understood that the epoxides may be added, in the form of an aqueous emulsion, to the wet pigment slurry resulting from hydroclassification, after which the treated pigment is dried and then milled.

As pointed out above the epoxides used for coating the pigment according to the present invention are epoxidized esters of fatty acids and in particular epoxidized glycerides and alkyl esters derived from fatty acids having 1-18 carbon chain length esterified with alcohols of 1-10 carbon chain length. Epoxides included within this group will have oxirane oxygens in the range of from 2-9% by weight and iodine numbers from 1-45.

Epoxides useful in the present invention include, in particular, the epoxidized monomeric esters of castor oil fatty acids and the fatty acids of soybean oil, linseed oil, cotton seed oil, corn oil and tall oil; as well as the alkyl esters, i.e. methyl, ethyl and acetyl esters of said oil fatty acids.

In addition epoxy intermediates formed by condensation of difunctional materials such as bisphenols, glycols, dibasic acids and the like with epichlorohydrin may be used effectively in the treatment of $TiO_2$ pigment for use as an opacifier in pigment vehicles. Included among these are polyepoxides, diepoxide polymers and glycidyl polyethers.

When these epoxides are used to treat a $TiO_2$ pigment the treated pigment has the unique effect of improving the dispersibility of the pigment in vinyl composites as well as enhancing the color of a polyvinyl resin made therefrom. Moreover when the epoxide is applied to a $TiO_2$ pigment in combination with a hydrous metal oxide the pigment dispersion and color of the pigmented polyvinyl resin is optimum and the pigmented polyvinyl resin has been found to have unexpectedly superior heat stability.

In order to illustrate the invention further specific examples are given below.

EXAMPLE 1

The following example shows a method of preparing an epoxide treated $TiO_2$ pigment and its use in a vinyl composite for producing a polyvinyl resin having superior color and pigment dispersion.

150 grams of calcined $TiO_2$ pigment, having no pre or postcalcination treatment with hydrous metal oxides, and which had been wet milled, classified and dried was added, as an aqueous slurry to an epoxide solution consisting of 1.5 grams of polyepoxide linseed oil (I–b) on a $TiO_2$ weight basis having an iodine number of 5.00 and 9.0% oxirane oxygens, dissolved in 400 cc. of acetone. The mixture was dried, chaser milled and micro-pulverized.

Tinting strength test

In order to test the color characteristics, i.e. tinting strength and tone, of a polyvinyl resin pigmented with the epoxide treated pigment prepared as described above the following gray polyvinyl composite recipe was used:

| | Parts |
|---|---|
| Polyvinyl chloride resin | 100.00 |
| Plasticizer—(dioctyl phthalate) | 34.00 |
| Stabilizer (barium-cadmium salt) | 2.50 |
| Stearic acid | 0.50 |
| $TiO_2$ (epoxide treated) | 7.00 |
| Carbon black—pigment grade | 0.15 |

The above recipe components were dry blended and then mixed for 5 minutes on a two roll rubber mill at 330° F. The resulting pigmented polyvinyl sheet was press polished in a suitable mold under heat and pressure and was light gray in color. A similar procedure was used in preparing a polyvinyl test panel as a control, pigmented with the same pigment but without the epoxide treatment.

These test panels were then tested using a Colormaster Differential Colorimeter (manufactured by the Manufactures Engineering and Equipment Corp. at Hatboro, Pa.) by which the green (G), red (R) and blue (XB) reflectance values of the test panel, pigmented with the epoxide treated pigment, were compared with the corresponding reflectance values of the control. As currently practiced in the pigment art the green (G) reflectance value is indicative of tinting strength or higing power while tone, i.e. relative blueness or yellowness is determined by the value of $R-XB/G$, which is referred to in the tables as Y.

With respect to the readings of the Colormaster it must be appreciated that differences between the reflectance values of the test panel and the control panel of the order of 0.15 to 0.20 units are easily distinguishable visually by an expert in this technique and sufficiently distinct to mark the difference between a pigmented polyvinyl resin which is commercially acceptable and one which is not.

By reference to Table I below it will be seen that as regards the tinting strength of the test panel pigmented with the epoxide treated pigment, (I–b) of Example I, the reading of the green reflectance value (G) is appreciably higher than the corresponding reading of the control panel (I–a) thus indicating the superior tinting strength of test panel (I–b).

Similarly by comparing the values for tone it will be seen that the Y value of test panel (I–b) is lower, algebraically, than that of the control thus indicating that the test panel has a bluish tone which is generally preferred and is definitely superior, from the standpoint of commercial acceptance, to yellowish tones.

Additional experiments were conducted using a TiO$_2$ pigment which had been given a post calcination treatment with the hydrous oxides of titanium and aluminum in amounts of 0.5% and 1.0% respectively and then treated with an epoxide as described in Example I. One sample, (I–c), of the hydrous metal oxide coated pigment had no epoxide treatment and was used as a control.

In addition to tinting strength and tone these pigments were also tested for dispersion in a polyvinyl resin using the test procedure described below:

Test for dispersion

The epoxide coated pigments described herein were tested for dispersion in a polyvinyl chloride resin as follows. Using the blue vinyl composite recipe below:

| | Parts |
|---|---|
| Polyvinyl chloride resin | 300.00 |
| Plasticizer—dioctyl phthalate | 193.50 |
| Stabilizer (barium-cadmium salt) | 9.00 |
| Stearic acid | 1.50 |
| Colorant (phthalocyanine blue) | 0.12 | the constituents were thoroughly mixed by stirring vigorously in a Pony mixer. 200 parts of this blue vinyl composite were then converted into a pigmented test sheet by first banding the composite recipe on a two roll rubber mill at 300° F. and then adding 5.25 parts of an epoxide treated pigment to the banded vinyl composite and mixing for two minutes on the mill. The resulting pigmented polyvinyl sheet, when removed from the mill, was light blue in color and about 0.44 mil. thick.

Each vinyl sheet, or test panel, was then inspected visually for any pigment particles appearing in its surface, each particle being circled by means of a crayon or the like to facilitate counting. The total number of particles in a given area, in this case an area 6 by 8 inches, was then counted and the number of visible pigment particles per unit (square inch) was computed. This number was taken as the measure of the dispersion of the pigment in the polyvinyl resin a high number being indicative of poor dispersion.

Turning again to Table I it will be seen that the tinting strength of the test panel (I–d) containing a pigment treated with an epoxidized castor oil, in combination with the hydrous oxides of aluminum and titanium, had a higher green reflectance value and hence tinting strength than that of the control panel (I–c). Similarly the value for Y of the test panel (I–d) was lower, algebraically, then that of the control.

The results of the dispersion tests on blue vinyl test panels containing the pigment treated with hydrous metal oxides with and without an epoxide are also shown in Table I. A comparison of the control panel (I–c) with the test panel (I–d) shows that whereas the dispersion value of the control panel is 0.98 the dispersion rating of the test panel (I–b) is only 0.23 clearly indicating the superior dispersibility of the epoxide treated pigment over an untreated pigment.

The pigment used in test panel (I–d) was also used in test panel (I–e) except that the epoxide was an epoxidized castor oil having a somewhat higher degree of epoxidation, its oxirane oxygen value being 2.7% and its iodine number 35. The pigmented polyvinyl test panel was then tested for color and dispersion.

Again, as shown in Table I, the tinting strength and tone of the gray polyvinyl panel pigmented with the epoxide treated pigment were superior to the control. Likewise the dispersion ratings in a blue polyvinyl panel were superior to those of the control.

EXAMPLES II–V

In exploring the scope of epoxides which are effective in the treatment of pigment for producing polyvinyl resins of superior tinting strength, tone and pigment dispersion, other epoxides were used in much the same manner as that described in Example I above.

As indicated in Table I these experiments are grouped from II to V with several different epoxides in each respective group and each group having a control. The epoxide treated pigment used in these experiments also had a post calvination treatment with alumina and titania.

The epoxides of Example II namely (II–b) and (II–d) are derived from oybean oil and have different degrees of epoxidation as indicated by their different percentages of oxirane oxygen and iodine numbers. The epoxide of (II–c) is an acetylated castor oil having percent oxirane oxygen and iodine numbers intermediate those of the soybean epoxides.

In each instance however the test panels prepared by using the epoxide treated pigments of Example II had superior tinting strength and tone to those of the control (II–a); the pigments having superior dispersibility in a blue polyvinyl resin as compared to that of an untreated pigment.

The epoxides of Example III include an isooctyl epoxy stearate of tall oil (III–b) and a polyepoxide of linseed oil (III–c) each of which gave epoxidized pigments having superior tinting strength, tone and dispersibility characteristics in polyvinyl resins over those of the control.

As a further indication of the uniqueness of the epoxide treated pigments herein described a comparison was made between the epoixde treated pigments of Example III and an identical pigment treated with a commercially available plasticizer, in this instance dioctyl sebacate (III–f). While used in the same amount the effect of the latter on the tinting strength and tone of the test panel, as seen by comparing the figures in Table I, was so slight as to produce no discernible improvement over the control. Concerning dispersion ratings, considering the large amount of plasticizer used in the vinyl composite recipe itself it could be expected that treating the pigment with an amount proportional to the small amounts of epoxide used would give no improvement over the control.

EXAMPLE IV

In this example the epoxide was a methyl ester of castor oil (IV–b) having 2.8% oxirane oxygen and an iodine number of 24; and was used to treat TiO$_2$ pigment in the manner of Example I above. It will be seen, by comparing the differences between the tinting strength and tone figures for panels containing the treated pigment and the control (IV–a), respectively, that this expoxidized pigment panel had exceptionally superior tinting strength and tone. Moreover the dispersion value (0.10) was the best of any of the epoxide treated pigments and far superior to the control which, in this instance was 1.31.

EXAMPLE V

In exploring the limits of the amount of epoxides necessary to produce superior tinting strength, tone and dispersion characteristics in the polyvinyl resins a series of polyvinyl panels were tested using pigments treated at the 0.25%–0.50% and 1.0% levels. For these tests the method of Example I and the epoxides i.e. epoxidized soybean oil, tall oil and linseed oil at different levels of epoxidation were used. Each test panel was prepared, as described above except that different amounts of epoxide were used. The results of the color and dispersion tests are shown in Table I. It is apparent that at the 0.25% level (V–b) and (V–f) the amount of epoxide on the pigment is sufficient to give little more than an indication of improvement in tinting strength and tone. However, at both the .50% and 1.0% levels tinting strength and tone are highly superior to the controls for each of the epoxides tested; and that in each instance the maximum improvement per unit of addition occurred at about the 0.5% level.

EXAMPLES VI–VII–VIII

Further evidence of the uniqueness of the epoxide treated pigment was discovered when a comparison was made between a series of polyvinyl resins containing pigments treated with the epoxides derived from linseed, soybean and tall oil fatty acids; and polyvinyl resins pigmented with a non-epoxidized pigment but containing the same epoxides in the same amounts in the vinyl composite recipe itself.

Each test panel was tested for tinting strength, tone and dispersion ratings as in Example I above and the values tabulated in Table II below. It is evident that the values of tinting strength and tone of the test panels (VI-a) and (VIII-a) pigmented with the epoxidized pigment are significantly higher than those (VI-b) and (VIII-b) in which the epoxide was added to the vinyl composite recipe itself. Similarly a marked superiority was found in the dispersion of the epoxidized pigment as against that of the untreated pigment in the vinyl-resin composite recipe.

From the foregoing description and examples it is apparent that a $TiO_2$ pigment treated with an epoxide either alone or in combination with hydrous metal oxides such as alumina and titania has improved dispersion in polyvinyl composites and imparts superior color stability to the pigmented polyvinyl resin.

TABLE I

[Tinting strength and tone of gray vinyl resins pigmented with epoxide treated $TiO_2$—dispersion of epoxide-treated $TiO_2$ in blue vinyl resins]

| | Exponent Number | | |
|---|---|---|---|
| | I-a | I-b | I-c |
| Epoxidized oil | [1] Control | [2] | [3] Control |
| Amount, percent by weight $TiO_2$ | None | 1.0 | |
| Iodine No | | 5.00 | |
| Oxirane Oxygen, percent | | 9.00 | |
| Colormaster Ratings of gray vinyl: | | | |
| G (tinting strength) | 18.67 | 19.04 | 17.86 |
| R | 18.95 | 19.21 | 18.34 |
| XB | 20.08 | 20.80 | 19.88 |
| Y (tone) | −6.05 | −8.35 | −7.22 |
| Dispersion in blue vinyl (particles per square inch) | | | 0.98 |

| | Exponent Number | | | |
|---|---|---|---|---|
| | I-d | I-e | II-a | II-b |
| Epoxidized oil | Castor | Castor | [3] Control | Soybean |
| Amount, percent by weight $TiO_2$ | 0.50 | 0.50 | None | 0.50 |
| Iodine No | 45.00 | 35.00 | | 4.00 |
| Oxirane Oxygen, percent | 2.00 | 2.70 | | 6.40 |
| Colormaster Ratings of gray vinyl: | | | | |
| G (tinting strength) | 18.20 | 18.29 | 17.83 | 18.10 |
| R | 18.34 | 18.43 | 17.99 | 18.24 |
| XB | 19.88 | 19.94 | 19.29 | 19.70 |
| Y (tone) | −8.46 | −8.26 | −7.29 | −8.07 |
| Dispersion in blue vinyl (particles per square inch) | 0.23 | 0.15 | 1.18 | 0.18 |

| | Exponent Number | | | |
|---|---|---|---|---|
| | II-c | II-d | III-a | III-b |
| Epoxidized oil | [4] | Soybean | [3] Control | [5] |
| Amount, percent by weight $TiO_2$ | 0.50 | 0.50 | None | 0.50 |
| Iodine No | 3.00 | 9.20 | | 3.00 |
| Oxirane Oxygen, percent | 3.60 | 6.10 | | 4.80 |
| Colormaster Ratings of gray vinyl: | | | | |
| G (tinting strength) | 18.11 | 18.19 | 17.79 | 18.15 |
| R | 18.25 | 18.34 | 17.95 | 18.26 |
| XB | 19.73 | 19.85 | 19.21 | 19.74 |
| Y (tone) | −8.17 | −8.30 | −7.08 | −8.15 |
| Dispersion in blue vinyl (particles per square inch) | 0.12 | 0.39 | 1.31 | 0.25 |

TABLE I—Continued

| | Exponent Number | | |
|---|---|---|---|
| | V-a | V-b | V-c |
| Epoxidized oil | [3] Control | Soybean | Soybean |
| Amount, percent by weight $TiO_2$ | None | 0.25 | 0.50 |
| Iodine No | | 1.00 | 1.00 |
| Oxirane Oxygen, percent | | 6.90 | 6.90 |
| Colormaster Ratings of gray vinyl: | | | |
| G (tinting strength) | 18.22 | 18.31 | 18.48 |
| R | 18.34 | 18.43 | 18.60 |
| XB | 19.83 | 19.86 | 20.09 |
| Y (tone) | −8.18 | −7.81 | −8.06 |
| Dispersion in blue vinyl (particles per square inch) | | | |

| | Exponent Number | | | |
|---|---|---|---|---|
| | III-c | III-d | IV-a | IV-b |
| Epoxidized oil | (2) | (6) | [3] Control | (7) |
| Amount, percent by weight $TiO_2$ | 0.50 | 0.50 | None | 0.50 |
| Iodine No | 5.00 | | | 24.00 |
| Oxirane Oxygen, percent | 9.00 | | | 2.80 |
| Colormaster Ratings of gray vinyl: | | | | |
| G (tinting strength) | 18.33 | 17.90 | 17.86 | 18.54 |
| R | 18.47 | 18.14 | 18.01 | 18.68 |
| XB | 20.05 | 19.50 | 19.31 | 20.36 |
| Y (tone) | −8.62 | −7.57 | −7.28 | −9.06 |
| Dispersion in blue vinyl (particles per square inch) | 0.58 | | 1.31 | 0.10 |

| | Exponent Number | | |
|---|---|---|---|
| | V-d | V-e | V-f |
| Epoxidized oil | Soybean | (5) | (2) |
| Amount, percent by weight $TiO_2$ | 1.00 | 1.00 | 0.25 |
| Iodine No | 1.00 | 3.00 | 5.00 |
| Oxirane Oxygen, percent | 6.90 | 4.80 | 9.00 |
| Colormaster Ratings of gray vinyl: | | | |
| G (tinting strength) | 18.60 | 18.66 | 18.23 |
| R | 18.85 | 18.91 | 18.35 |
| XB | 20.48 | 20.52 | 19.79 |
| Y (tone) | −8.78 | −8.65 | −7.90 |
| Dispersion in blue vinyl (particles per square inch) | | | |

[1] $TiO_2$ pigment—No epoxide treatment and no treatment with hydrous metal oxides.
[2] Polyepoxide linseed.
[3] Rutile $TiO_2$ pigment treated with 0.5% $TiO_2$+1.0% $Al_2O_3$.
[4] Acetylated castor.
[5] Isooctyl tallate.
[6] Dioctyl sebacate.
[7] Methyl ricinoleate.

TABLE II

[Tinting strength, tone and dispersion ratings of vinyl resins containing epoxide and untreated $TiO_2$ versus vinyl resin pigmented with epoxide-treated $TiO_2$]

| | Exp. No. | | |
|---|---|---|---|
| | VI-a | VI-b | VII-a |
| Epoxidized Oil | (1) | (1) | Soybean |
| Amount, percent by weight $TiO_2$ | 0.50 | None | 0.50 |
| Amount, percent by weight in vinyl resin | None | 1.00 | None |
| Colormaster Ratings of gray vinyl: | | | |
| G (tinting strength) | 18.33 | 17.94 | |
| R | 18.47 | 18.21 | |
| XB | 20.05 | 19.45 | |
| Y (tone) | −8.62 | −6.90 | |
| Dispersion in blue vinyl (particles per square inch) | 0.16 | 10.95 | 0.14 |

TABLE II—Continued

| | Exp. No. | | |
|---|---|---|---|
| | VII-b | VIII-a | VIII-b |
| Epoxidized Oil | Soybean | (²) | (²) |
| Amount, percent by weight TiO₂ | None | 0.5 | None |
| Amount, percent by weight in vinyl resin | 1.00 | None | 1.00 |
| Colormaster Ratings of gray vinyl: | | | |
| G (tinting strength) | 17.80 | 18.15 | 18.05 |
| R | 18.10 | 18.26 | 18.34 |
| XB | 19.26 | 19.74 | 19.61 |
| Y (tone) | −6.52 | −8.15 | −7.05 |
| Dispersion in blue vinyl (particles per square inch) | 3.50 | 0.14 | 3.48 |

¹ Polyepoxide linseed.
² Isooctyl tallate.

While hydrous metal oxides used in the foregoing examples to treat the epoxidized pigment were titania and alumina it has also been found that when an epoxide is used in combination with the hydrous oxides of zinc, magnesium or aluminum the treated pigment will impart improved heat stability to a pigmented polyvinyl resin in addition to improved dispersion and color. This discovery is illustrated by the examples given below.

*Heat stability test*

Polyvinyl test panels were prepared using epoxide treated pigments, in combination with hydrous oxides of zinc, magnesium and aluminum, in a white vinyl composite recipe comprising:

| | Parts |
|---|---|
| Polyvinyl chloride resin | 1000.00 |
| Plasticizer (dioctyl phthalate) | 34.00 |
| Stabilizer (barium cadmium salt) | 1.75 |
| Stearic acid | .50 |
| TiO₂ | 7.00 | by dry blending the above ingredients and then mixing them on a two roll rubber mill at 350° F. for 30 minutes. Color measurements of each test panel were made on a Colormaster Differential Colorimeter, in the manner herein above described, a comparison of the Y values of the pigmented resin as against a test panel being indicative of the heat stability of the pigmented polyvinyl resin—the lower the Y value the better the heat stability. In these experiments the pigment used in the control test panel was untreated i.e. had no hydrous metal oxide and no epoxide.

EXAMPLES IX–XXI

Several test panels were prepared using this untreated pigment as a base, each sample, with the exception of the control (Example IX), having a different treatment with and without an epoxide in combination with a hydrous metal oxide selected from the group consisting of the hydrous oxides of Zn, Mg, Al, Ti and mixtures thereof. Each pigment was incorporated in the white vinyl resin recipe disclosed above from which polyvinyl resin test panels were prepared and tested on a Colorimeter. The several types of treated pigment used and the results of the heat stability tests are shown in Table III below.

The test panel of Example IX was used as a control and as shown in Table III its heat stability, as measured by its Y value was −23.5. The pigment used in Example X had only precalcination hydrous zinc oxide treatment while the pigment used in Example XI had a precalcination treatment with hydrous zinc oxide and a post calcination treatment with an epoxide. While the former treatment gave a test panel having a significant improvement in heat stability over the control panel, the pigmented test panel having the latter treatment had even greater improvement (−16.5) in heat stability.

Examples XII, XIII and XIV illustrate the effect of postcalcination treatments with the hydrous oxides of zinc, magnesium or aluminum without an epoxide and in each instance the heat stability of the test panel pigmented with a hydrous metal oxide treated pigment was superior to the control.

The TiO₂ pigments used in Examples XV–XXI had a post calcination treatment with the hydrous oxides of aluminum and titanium and were given additional treatments with the hydrous oxides of zinc or magnesium with and without an epoxide. Again it is evident that the hydrous metal oxide treatment affected an improvement in heat stability and that when the hydrous metal oxides were used in combination with an epoxide the improvement in heat stability was even more pronounced.

It is evident from the foregoing examples that polyvinyl resins pigmented with a TiO₂ pigment treated with hydrous metal oxides as the hydrous oxides of zinc, magnesium, aluminum or titanium, in combination with an epoxide, have surprisingly superior heat stability to that of polyvinyls pigmented with an untreated TiO₂ pigment.

The foregoing description and examples are illustrative in nature and it will be understood that the invention may be carried out in other specific ways than those herein set forth without departing from the spirit and essential characteristics of the invention and that the present embodiments are not to be considered as restrictive; and that all changes coming within the meaning and equivalency range of the appended claims are intended to be embraced therein.

What is claimed is:

1. An epoxide-coated TiO₂ pigment characterized by improved dispersibility in and the capacity for enhancing color of a polyvinyl resin, said pigment having a coating thereon, of an epoxide selected from the group consisting of epoxidized glycerides and epoxidized alkyl esters of esterified fatty acids having from 1–18 carbon chain length esterified with alcohols of from 1–10 carbon chain length said epoxide coating being in an amount of at least about 0.25% by weight of said pigment.

2. Pigment according to claim 1 wherein the percent oxirane oxygen of said epoxide is in the range of from about 2.0% to about 9% and the iodine number is in the range of from about 1 to about 45.

3. Pigment according to claim 1 wherein said epoxide is an epoxidized castor oil having an iodine number from about 24 to 45 and from about 2% to 4% oxirane oxygen.

4. Pigment according to claim 1 wherein said epoxide is an epoxidized soybean oil having an iodine number

TABLE III

[Heat stability of polyvinyl resin pigmented with metal oxide treated pigment]

| Example | IX | X | XI | XII | XIII | XIV | XV | XVI | XVII | XVIII | XIX | XX | XXI |
|---|---|---|---|---|---|---|---|---|---|---|---|---|---|
| Pig. Treatment | Control | | | | | | | | | | | | |
| Pre. Calc'n (percent by wt. TiO₂): | | | | | | | | | | | | | |
| ZnO | None | 0.5 | 0.5 | None | None | None | None | None | 0.5 | None | None | None | None |
| Post Calc'n (percent by wt. TiO₂): | | | | | | | | | | | | | |
| ZnO | None | None | None | 0.5 | None | None | None | None | None | 0.5 | 0.5 | None | None |
| MgO | None | None | None | None | 0.5 | None | None | None | None | None | None | 0.5 | 0.5 |
| Al₂O₃ | None | None | None | None | None | 0.5 | 1.0 | 1.0 | 1.0 | 1.0 | 1.0 | 1.0 | 1.0 |
| TiO₂ | None | None | None | None | None | None | 0.5 | 1.5 | 0.5 | 0.5 | 0.5 | 0.5 | 0.5 |
| Epoxide (percent by wt. TiO₂) | None | None | ¹ 0.65 | None | None | None | None | ² 0.65 | ². 65 | None | ². 65 | None | ² 0.65 |
| Y | −23.5 | −19.6 | −16.5 | −18.1 | −21.3 | −21.0 | −20.9 | −20.4 | −16.8 | −19.2 | −17.1 | −20.7 | −19.5 |

¹ Epoxidized linseed oil.   ² Epoxidized soybean oil.

from about 1 to 10 and from about 5% to 7% oxirane oxygen.

5. Pigment according to claim 1 wherein said epoxide is an epoxidized tall oil having a maximum iodine number of about 3 and from about 4% to 5% oxirane oxygen.

6. Pigment according to claim 1 wherein said epoxide is an epoxidized linseed oil having an iodine number of about 5 and about 9% oxirane oxygen.

7. Pigment according to claim 3 wherein said epoxidized castor oil is epoxidized methyl ricinoleate having a maximum iodine number of 24 and about 3% oxirane oxygen.

8. Pigment according to claim 3 wherein said epoxidized castor oil is epoxidized acetylated castor oil having an iodine number of 3 and about 4% oxirane oxygen.

9. A $TiO_2$ pigment capable of enhancing the color, pigment dispersion and heat stability of a polyvinyl resin when incorporated therein said pigment having a coating thereon comprising a hydrous metal oxide in combination with an epoxide in an amount of at least about 0.25% by weight of the finished pigment, said epoxide being selected from the group consisting of epoxidized esters of fatty acids having from 1–18 carbon chain length and esterified with alcohols of from 1–10 carbon chain length.

10. Pigment according to claim 9 wherein the hydrous metal oxide is selected from the group consisting of the hydrous oxides of zinc, magnesium, aluminum, titanium and mixtures thereof, said hydrous metal oxides being in an amount of at least about 0.25% by weight of the finished pigment, and the amount of said epoxide is from about 0.5% to 1.0% by weight of the finished pigment.

11. A process for producing an epoxide coated $TiO_2$ pigment characterized by improved dispersibility in and the capacity for enhancing color of pigmented vehicles comprising the steps of: adding an epoxide consisting of an epoxidized ester selected from the group consisting of epoxidized glycerides and epoxidized alkyl esters of esterified fatty acids having from 1–18 carbon chain length esterified with alcohols of from 1–10 carbon chain length to an epoxide dispersing medium selected from the group consisting of water and acetone to form an epoxide dispersion containing from 0.25% to 1.0% of said epoxide on a pigment weight basis, applying said dispersed epoxide to said $TiO_2$ pigment to form an epoxide coating thereon and then drying the coated pigment.

12. Process according to claim 11 wherein said epoxide dispersing medium is water and said resulting epoxide dispersion is an aqueous epoxide emulsion.

13. Process according to claim 11 wherein said epoxide dispersing medium is acetone, said resulting epoxide dispersion being an epoxide solution, which is applied to said pigment by spraying.

14. Process according to claim 13 wherein said epoxide solution is applied to said pigment by slurrying said pigment in said epoxide solution.

15. A process for producing a $TiO_2$ pigment characterized by improved dispersibility in and the capacity for enhancing the color and heat stability of pigmented polyvinyl resins comprising the steps of: coating a $TiO_2$ pigment with a hydrous metal oxide selected from the group consisting of the hydrous oxides of zinc, magnesium, aluminum, titanium and mixtures thereof, preparing an epoxide dispersion by adding an epoxide selected from the group consisting of epoxidized glycerides and epoxidized alkyl esters of esterified fatty acids having from 1–18 carbon chain length esterified with alcohols of from 1–10 carbon chain length to an epoxide dispersing medium selected from the group consisting of water and acetone to form an epoxide dispersion containing from 0.25% to 1.0% of said epoxide on a pigment weight basis, applying said dispersed epoxide to said hydrous metal oxide coated $TiO_2$ pigment to form an epoxide coating thereon and then drying the coated pigment.

16. A pigmented polyvinyl resin comprising a polyvinyl resin and a $TiO_2$ pigment, said $TiO_2$ pigment being characterized by having thereon a coating of an epoxide in an amount of at least 0.25% by weight of the finished pigment, said epoxide comprising an epoxidized ester selected from the group consisting of epoxidized glycerides and epoxidized alkyl esters of esterified fatty acids having from 1–18 carbon chain length and esterified with alcohols of from 1–10 carbon chain length.

17. A pigmented polyvinyl resin comprising a polyvinyl resin and a $TiO_2$ pigment said pigment being characterized by a hydrous metal oxide coating in combination with an epoxide coating, said hydrous metal oxide coating being in an amount of at least about 0.25% by weight of the finished pigment and selected from the group consisting of the hydrous oxides of zinc, magnesium, aluminum, titanium and mixtures thereof, said epoxide coating being in an amount of at least about 0.25% by weight of the finished pigment, and comprising an epoxidized ester selected from the group consisting of epoxidized glycerides and epoxidized alkyl esters of esterified fatty acids having from 1–18 carbon chain length esterified with alcohols of from 1–10 carbon chain length.

18. Pigmented polyvinyl resin according to claim 17 wherein the hydrous metal oxides comprise from about 0.5%–2.0% aluminum oxide, from about 0.25%–1.0% titanium oxide and at least about 0.25% zinc oxide, and the amount of epoxide on said hydrous metal oxide coated pigment is from 0.25% to 1.0% by weight of the finished pigment.

References Cited
UNITED STATES PATENTS

| | | | |
|---|---|---|---|
| 2,671,031 | 3/1954 | Whately | 106—308 |
| 2,731,338 | 1/1956 | Fike et al. | 106—308 |
| 2,868,663 | 1/1959 | Jarmus et al. | 106—300 |
| 3,047,415 | 7/1962 | Rhodes et al. | 260—23 |
| 3,071,560 | 1/1963 | Fetscher et al. | 260—23 |

FOREIGN PATENTS

| | | |
|---|---|---|
| 224,322 | 10/1959 | Australia. |
| 831,033 | 3/1960 | Great Britain. |
| 892,258 | 2/1962 | Great Britain. |

DONALD E. CZAJA, *Primary Examiner.*

LEON J. BERCOVITZ, JAMES A. SEIDLECK, R. W. GRIFFIN, *Assistant Examiners.*